United States Patent [19]

Sharp

[11] 4,117,486

[45] Sep. 26, 1978

[54] BUOYANT CHAFF

[75] Inventor: Chester E. Sharp, Little Silver, N.J.

[73] Assignee: The United States of America as represented by the Secretary of the Army, Washington, D.C.

[21] Appl. No.: 115,045

[22] Filed: Jun. 5, 1961

[51] Int. Cl.[2] .......................... G01S 7/36; G01S 7/42; H01Q 17/00

[52] U.S. Cl. ................................. 343/18 B; 343/18 E

[58] Field of Search ................ 46/87, 88, 89; 206/0.6; 244/24, 31, 33; 343/18, 18 B, 880, 915, 915 A, 18 E

[56] References Cited

U.S. PATENT DOCUMENTS

| | | | |
|---|---|---|---|
| 465,971 | 12/1891 | Edison | 343/18 B |
| 1,005,871 | 10/1911 | Pennock | 244/33 |
| 1,793,075 | 2/1931 | Flowers | 343/18 B |
| 2,355,610 | 8/1944 | Tuggle | 244/24 |
| 2,646,019 | 7/1953 | Chetlan | 46/90 |
| 2,889,078 | 6/1959 | Thomas | 343/18 B |
| 2,996,212 | 8/1961 | O'Sullivan | 244/24 X |

*Primary Examiner*—S. C. Buczinski

*Attorney, Agent, or Firm*—Nathan Edelberg; Jeremiah G. Murray; Sheldon Kanars

EXEMPLARY CLAIM

1. A buoyant elongated tubular chaff element responsive to radio frequency energy comprising a hollow longitudinal body of relatively thin light weight flexible metal, a quantity of a gaseous medium lighter than air contained within said body sufficient to partially inflate the said body at normal atmospheric pressure and to fully inflate the said body at an altitude where the body weight equals the air displaced, the length of said body being substantially equal to one half the wave length of the radio frequency of operation.

2 Claims, 3 Drawing Figures

*INVENTOR.*
CHESTER E. SHARP

*BY* Harry M. Saragovitz
ATTORNEY.

BUOYANT CHAFF

The invention described herein may be manufactured and used by or for the Government for governmental purposes, without the payment of any royalty thereon.

The present invention relates to a means that serves as a more effective airborne electric countermeasure for military purposes by creating a false echo from enemy radar and to further serve as a passive reflector for radio communications purposes.

When used for military use, such means has been designated as chaff which is the code name applied to airborne electronic reflector materials used as a countermeasure against enemy radar. Generally, chaff, which comprises strips of aluminum, or other appropriate metallic electrically reflective material of various lengths is dropped from aircraft, or discharged from rockets, shells or the like to provide a reflector for enemy radar waves which will create a false echo, i.e. an echo which is not from the target.

Chaff, as presently produced, is cut from thin rolled sheet aluminum in thin ribbon strips of such length to correspond to a desired radio wave length against which it is used; or cut in long ribbons approximately ½ inch wide and 500 feet long and dispensed from rolls for use against long wave length radio or radar waves.

In its utilization, chaff is only effective for its intended purposes only as long as the chaff remains aloft. As presently constituted, the material from which the chaff is made, for example aluminum, has a greater weight than that of the volume of air it displaces. As a result, when chaff of such nature is dropped from an aircraft at a high altitude, the chaff falls at a rate of a few hundred feet per minute. It can thus be readily realized that such chaff because of its rapid rate of descent is soon out of range of radar waves directed to it and thus loses its effectiveness.

The primary object of the present invention is to provide a novel chaff and passive reflector structure that will have an effective life considerably greater than the chaff used at this time.

In order to attain the preceding object and to overcome the difficulties as set forth the improved radar reflector, or chaff, is so made so as to remain buoyant in air at substantially the same altitude at which the chaff is released from the aircraft and remains so aloft for a long period of time. This is accomplished by having the discrete element of chaff made of an extremely light weight electrically reflective material in tubular or other configuration having a shell thickness of about 1 mil and containing a quantity of gas lighter than air, such as hydrogen or helium within its cavity and having its ends hermetically sealed to prevent the loss of any of the gaseous medium.

The invention can best be understood from the following description to read in view of the accompanying drawing in which.

Figure 1:
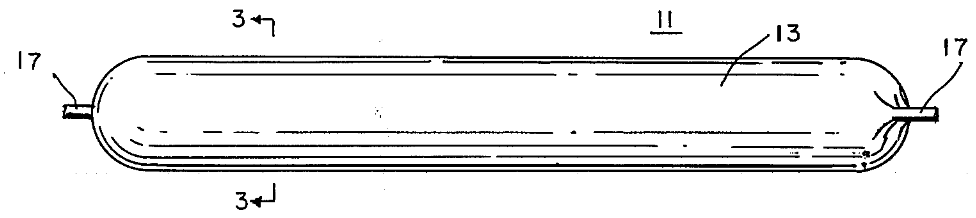
FIG. 1 is a single element of chaff, of the radar reflective structure.

In the drawings FIG. 1 shows a single element or section of chaff designated generally at 11 which is of tubular configuration having a shell thickness of about 1 mil. The chaff element includes an outer surface 13, a confined cavity 15 and hermetically sealed ends 17. The chaff element 11 is made of a material capable of reflecting radar signals impinging thereon, such as aluminum or other light weight metal. Within the cavity 15 there is contained a quantity of a gas lighter than air, such as hydrogen or helium which is kept contained within the cavity by hermetically sealing the ends 17. It is evident that a chaff element so constructed would be buoyant and remain suspended in air, at the altitude at which it is released, for a considerable length of time.

Figure 2:
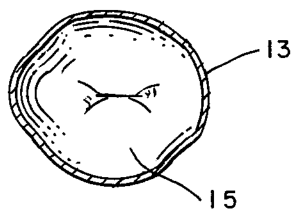
FIG. 2 is a cross section of the element of FIG. 1 shown partially inflated.
Figure 3:
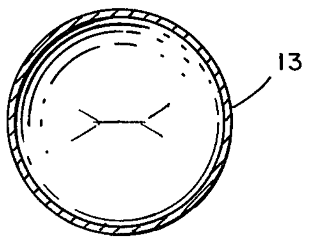
FIG. 3 is a cross section of the element of FIG. 1 shown fully inflated.

In the drawings, FIG. 2 shows the configuration of a single chaff element at ground or sea level. In such condition the element is partially inflated at normal atmosphere pressure. FIG. 3 shows the same element of chaff when fully inflated at the altitude where its weight equals the air displaced, without bursting due to the reduced atmospheric pressure. The altitude at which the chaff will remain suspended can be readily predetermined, since the weight of air to be displaced for a given volume for any height above the earth for a standard atmosphere is known.

The physical dimensions of the novel buoyant chaff herein described will be dependent upon the desired radio or radar range wave length against which it used similar to conventional ribbon like chaff, i.e. the length of any single element of chaff is equal to one-half wave length at frequency of operation. Thus, for example, a buoyant chaff element of ½ inch length would be used in frequency ranges in the order of about 9000 megacycles per second. In another instance a chaff element of about three inches in length could be used in frequency ranges of about 2000 megacycles per second.

The manner in which the single elements of buoyant electro magnetic wave reflector forming this invention are made is not critical. The present manufacturing techniques in fabricating lengths of tubings of extremely thin metal, for example under 2 mil thickness, partially filling such tubing with a desired gaseous medium and hermetically sealing the ends of such tubing can be utilized. One such technique is described in the publication "The Iron Age," Aug. 6, 1959 issue.

While there has been described herein one specific embodiment of the buoyant reflector element, it is obvious that modifications may be made without departing from the spirit and scope of the invention. Thus for example while the specific embodiment describes a chaff element of tubular or circular cross section, it is apparent that the chaff can be made of any desired shape, that is, for example oval or elliptical, square, rectangular etc.

Having described the invention what is claimed as new is:

1. A buoyant elongated tubular chaff element responsive to radio frequency energy comprising a hollow longitudinal body of relatively thin light weight flexible metal, a quantity of a gaseous medium lighter than air contained within said body sufficient to partially inflate the said body at normal atmospheric pressure and to fully inflate the said body at an altitude where the body weight equals the air displaced, the length of said body being substantially equal to one half the wave length of the radio frequency of operation.

2. Buoyant chaff responsive to radio frequency operation comprising a metallic hollow tubular body having a skin thickness of less than 2 mils, a gaseous medium lighter than air within said body and wherein said tubular body is of a length equal to one half of the wave length of the frequency of operation.

* * * * *